(12) United States Patent
Mason (10) Patent No.: US 11,898,643 B1
(45) Date of Patent: Feb. 13, 2024

(54) DUAL UNION BALL DRAIN VALVE WITH T-FLOW ADJUSTABILITY

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 0 days.

(21) Appl. No.: 18/090,139

(22) Filed: Dec. 28, 2022

(51) Int. Cl.
*F16K 11/087* (2006.01)
*F16K 5/06* (2006.01)
*F16K 37/00* (2006.01)
*F16K 31/60* (2006.01)
*F16K 27/06* (2006.01)

(52) U.S. Cl.
CPC .......... *F16K 11/087* (2013.01); *F16K 5/0605* (2013.01); *F16K 27/067* (2013.01); *F16K 31/602* (2013.01); *F16K 37/00* (2013.01)

(58) Field of Classification Search
CPC .. F16K 11/0873; F16K 5/0605; F16K 27/067; F16K 37/00; Y10T 137/87877; Y10T 137/8782
USPC .......................................................... 137/883
See application file for complete search history.

(56) References Cited

U.S. PATENT DOCUMENTS

| | | | |
|---|---|---|---|
| 3,333,699 A | 8/1967 | Bliss et al. | |
| 3,778,029 A | 12/1973 | Baker | |
| 4,129,149 A | 12/1978 | Brehmer et al. | |
| 5,433,243 A | 7/1995 | Griswold et al. | |
| 6,302,446 B1 | 10/2001 | Spears et al. | |
| 6,655,412 B2 | 12/2003 | Reck | |
| 7,631,662 B2 | 12/2009 | Reck | |
| 7,681,596 B2 * | 3/2010 | Reck ........................ | F16K 11/22 |
| | | | 137/883 |
| 8,375,991 B2 | 2/2013 | Erhardt | |
| 8,522,814 B2 | 9/2013 | Kempf et al. | |
| 8,770,223 B2 | 7/2014 | Reck | |
| 9,061,223 B2 | 6/2015 | Winborn | |
| 10,458,662 B2 | 10/2019 | Olsen et al. | |
| 11,408,153 B1 | 8/2022 | Mason | |
| 2004/0124386 A1 | 7/2004 | Carey | |
| 2008/0214466 A1 | 9/2008 | Cedarbaum | |
| 2010/0018911 A1 | 1/2010 | VanZeeland | |
| 2011/0073201 A1 | 3/2011 | Matsui et al. | |

(Continued)

FOREIGN PATENT DOCUMENTS

| | | |
|---|---|---|
| CN | 205781020 | 12/2016 |
| CN | 207195715 | 4/2018 |

(Continued)

OTHER PUBLICATIONS

Industrial Specialties Mfg., "Three-Way Ball Valve Flow Patterns," https://www.industrialspec.com/about-us/blog/detail/three-way-valve-t-port-I-port-flow-patterns/ (2018).

(Continued)

*Primary Examiner* — Michael R Reid
(74) *Attorney, Agent, or Firm* — PRICE HENEVELD LLP (57) ABSTRACT

A dual union drain valve has union couplings to permit a variety of fitting ends. The dual union drain valve has a T-valve member at the intersection of the tee-shaped valve body that can be rotated within the fluid passageway to provide a variety of options for selectively closing sections of the fluid passageway.

20 Claims, 10 Drawing Sheets

(56) References Cited

U.S. PATENT DOCUMENTS

| | | |
|---|---|---|
| 2016/0097550 A1 | 4/2016 | Karamanos |
| 2019/0032801 A1 | 1/2019 | Andersson |
| 2019/0226592 A1 | 7/2019 | Hussein et al. |
| 2022/0196166 A1 | 6/2022 | Mason et al. |

FOREIGN PATENT DOCUMENTS

| | | |
|---|---|---|
| GB | 2509714 | 7/2014 |
| JP | H07301351 | 11/1995 |

OTHER PUBLICATIONS

Webstone, Pro-Pal Series Union Ball Drain, www.webstonevalves.com/default.aspx?page=customer&file=customer/wecoin/customerpages/unionballdrain.htm (2020).

Webstone, Pro-Pal Series, Primary Secondary Purge Tee, www.webstonevalves.com/default.aspx?page=customer&file=customer/wecoin/customerpages/purgetee.htm (2020).

* cited by examiner

DUAL UNION BALL DRAIN VALVE WITH T-FLOW ADJUSTABILITY

BACKGROUND OF THE INVENTION

The present invention relates to dual union drain valve that can be used in plumbing systems. Drain valves can be used to drain fluid from a plumbing system, including associated attachments such as water heaters, heating systems, boilers, filtration units, or appliances. Typically, the use of a drain valve requires multiple components in order to attach the drain valve to the plumbing system and/or to associated attachments. Indeed, the variety of fittings on such plumbing system/attachment components requires multiple parts for the installation of a drain valve. Moreover, the positioning of the drain valve in a desired horizontal or vertical orientation can be difficult due to space constraints.

Thus, a dual union drain valve that can be coupled to any style of incoming and outgoing fitting along with a reversible T-valve that permits the valve to be installed in any orientation would be advantageous.

SUMMARY OF THE INVENTION

One aspect of the present invention is a dual union drain valve. The drain valve has a tee-shaped valve body with a fluid passageway between a first port, a second port disposed opposite the first port, and a third port. The third port is disposed perpendicular to the first and second ports. The dual union drain valve has a first valve assembly disposed at the intersection in the tee-shaped valve body. The first valve assembly includes a ball with three openings that can be positioned within the fluid passageway. The ball is coupled to a stem having a T symbol that corresponds to the three openings such that the side of the ball that has no fluid passageway opening is in alignment with the flat top of the T symbol. A removable handle is coupled to the stem. At least one handle stop is located on the valve body permitting the handle to rotate within a 180 degree range. A second valve assembly is disposed adjacent to the third port. The dual union drain valve has a first fitting with a first union coupling having an internal threaded surface that couples with an external threaded surface on the first port. A second fitting with a second union coupling has an internal threaded surface is coupled with an external threaded surface on the second port.

Another aspect of the present invention is a dual union valve. The dual union valve has a tee-shaped valve body with a fluid passageway between a first port, a second port disposed opposite the first port, and a third port. The third port is disposed perpendicular to the first and second ports. A first valve assembly is disposed at the intersection in the tee-shaped valve body. The first valve assembly includes a ball with three openings that can be positioned within the fluid passageway. The ball is coupled to a stem having a T symbol that corresponds to the three openings such that the side of the ball that has no fluid passageway opening is in alignment with the flat top of the T symbol. A removable handle is coupled to the stem. At least one handle stop is located on the valve body, permitting the handle to rotate within a 180 degree range. A first fitting with a first union coupling having an internal threaded surface is coupled with an external threaded surface on the first port. A second fitting with a second union coupling having an internal threaded surface that is coupled with an external threaded surface on the second port.

Yet another aspect of the present invention is a dual union drain valve having a tee-shaped valve body with a fluid passageway between a first port, a second port disposed opposite the first port, and a third port. The third port has a threaded external surface and is disposed perpendicular to the first and second ports. A first valve assembly is disposed at the intersection in the tee-shaped valve body. The first valve assembly includes a ball with three openings that can be positioned within the fluid passageway. The ball is coupled to a stem having a T symbol that corresponds to the three openings such that the side of the ball that has no fluid passageway opening is in alignment with the flat top of the T symbol. The dual union drain valve has a removable handle coupled to the ball, the removable handle permitting the rotation of the ball and the stem within the intersection when the handle is removed. A second valve assembly is disposed adjacent to the third port. A first fitting with a first union coupling having an internal threaded surface is coupled with an external threaded surface on the first port. A second fitting with a second union coupling having an internal threaded surface is coupled with an external threaded surface on the second port.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
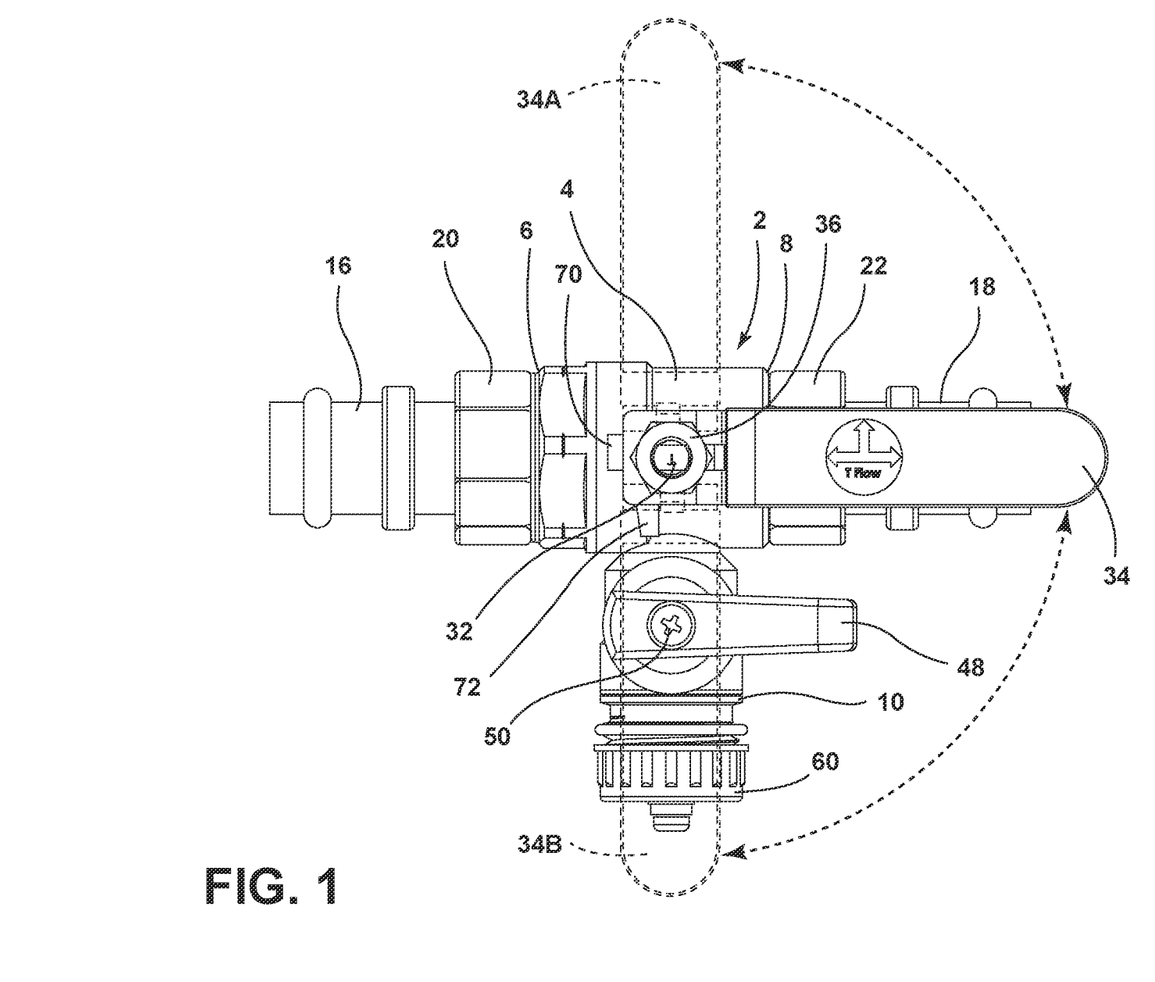
FIG. 1 is a front view of the dual union drain valve, illustrating various handle positions.

A dual union drain valve 2 is illustrated in FIG. 1. The dual union drain valve 2 has a valve body 4 with a first port 6, a second port 8, and a third port 10. The valve body 4 is tee shaped and has an intersection in the fluid passageway 5 where the perpendicular sections of the valve body 4 intersects. The first port 6 and second port 8 are positioned opposite each other, with the third port 10 being positioned perpendicular to the first port 6 and second port 8.

Figure 3:
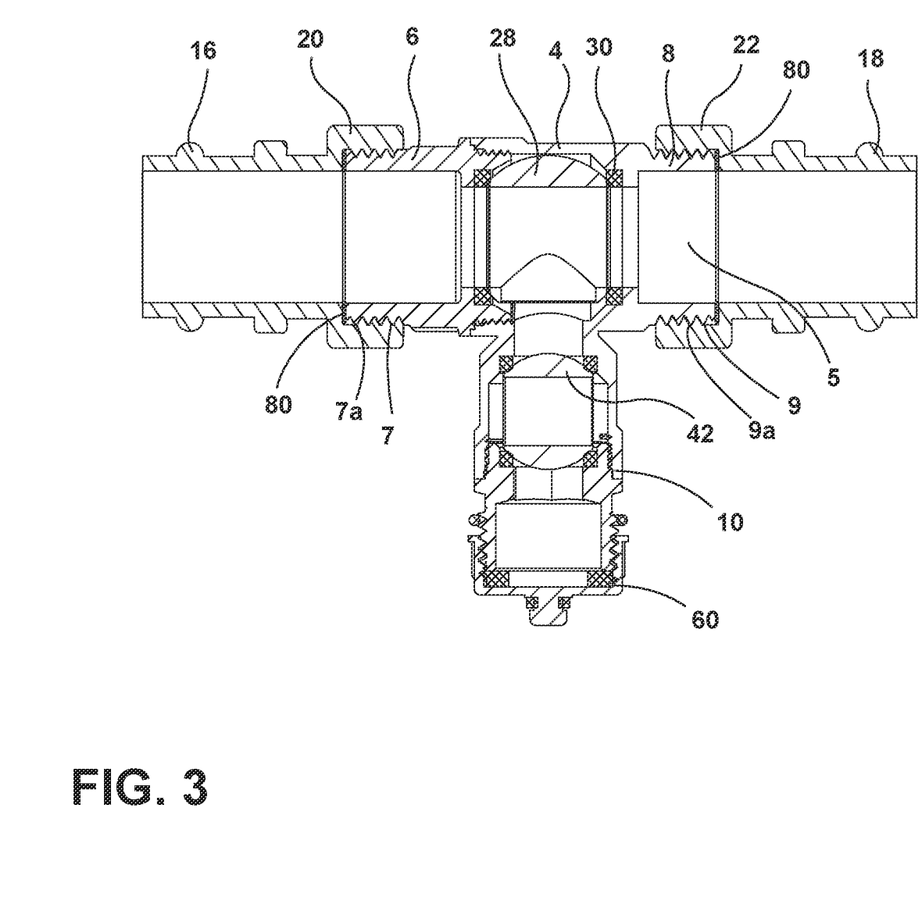
FIG. 3 is a cross-sectional front view of the dual union drain valve shown in FIG. 1.
Figure 4:
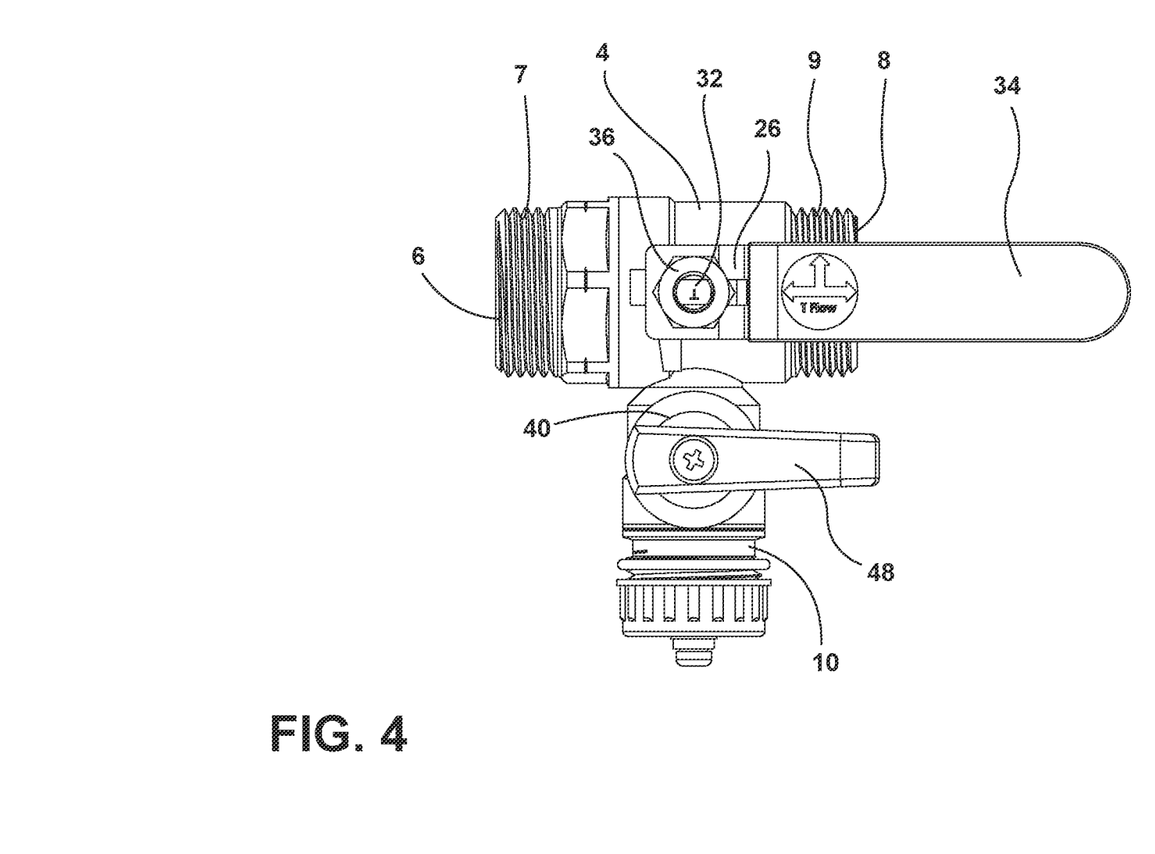
FIG. 4 is a front view of the dual union drain valve shown in FIG. 1 without the fitting ends.

The first port 6 includes a threaded exterior surface 7 as shown in FIG. 4. The second port 8 also has a threaded exterior surface 9. A first fitting 16 can be coupled to the first port 6 by a first union coupling 20. The first union coupling 20 has a threaded internal surface 7a that couples to the threaded exterior surface 7 as shown in FIG. 3. Similarly, a second fitting 18 can be coupled to the second port 8 by a second union coupling 22. The second union coupling 22 has a threaded internal surface 9a that couples to the threaded exterior surface 9.

In the illustrated embodiments, the first fitting 16 and the first union coupling 20 are shown as a single piece. However, the first fitting end 16 and the first union coupling 20 may be separate pieces. The second fitting 18 and the second union coupling 22 may similarly be a single piece or separate pieces.

A sealing member 80 may be used between a surface of the ports (6, 8) and a surface of the fittings (16, 18) as shown in FIG. 3. Such a sealing member 80 should be of a compressible material, such as an EPDM ring.

Figure 9:
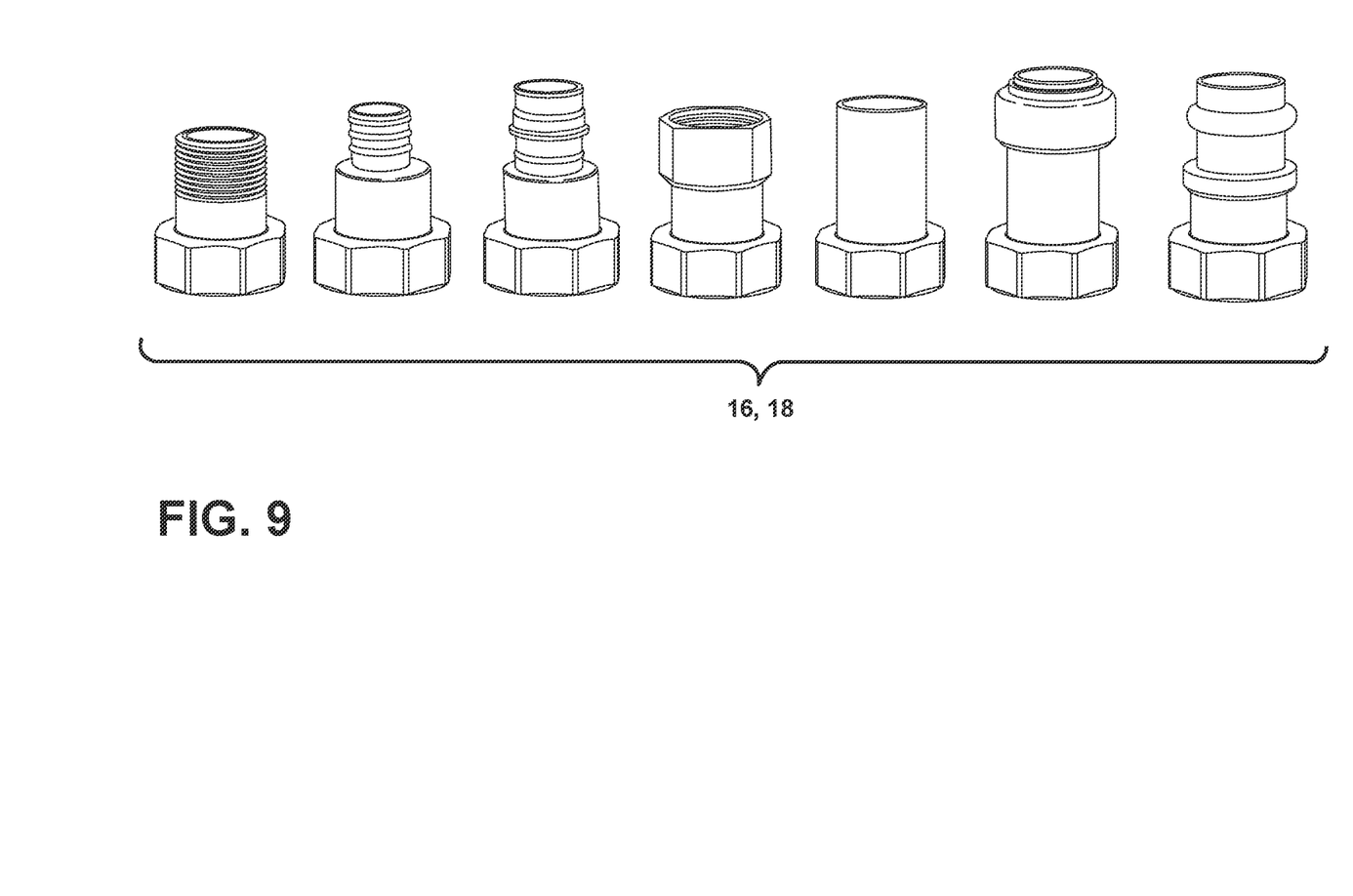
FIG. 9 is a front perspective view of various fitting ends.

A variety of fittings can be used as the first fitting 16 and/or second fitting 18. Examples of such fittings are shown in FIG. 9, including, from left to right, male iron pipe (MIP), PEX, PEX, female iron pipe (FIP), sweat, push-to-connect, and press. The first fitting 16 can be the same type of fitting as the second fitting 18 or the fittings may be different and/or different sizes.

The dual union valve 2 has a first valve member 26. The first valve member 26 is located at the intersection in the shaped valve body 4. The first valve member 26 has a ball 28 that is positioned within the fluid passageway 5. Three quadrants of the ball 28 have fluid passageway openings. The fourth quadrant does not have a fluid passageway opening. The ball 28 is a T-flow valve permitting potential flow in three directions through the ball, depending upon whether the openings are aligned or partially aligned with one of the ports (6, 8, and 10). The ball 28 is coupled to a stem 32. The stem 32 has a T symbol on the top which shows the position of the openings in the ball 28. The quadrant of the ball 28 that has no fluid passageway opening should align with the flat top of the T symbol when the stem 32 is fully secured to the ball 28. The ball 28 is sealed within the fluid passageway 5 by ball seals 30. The stem 32 is positioned within the stem boss 38 on the valve body 4. A handle 34 is coupled to the stem 32 by a nut 36.

Figure 1A:
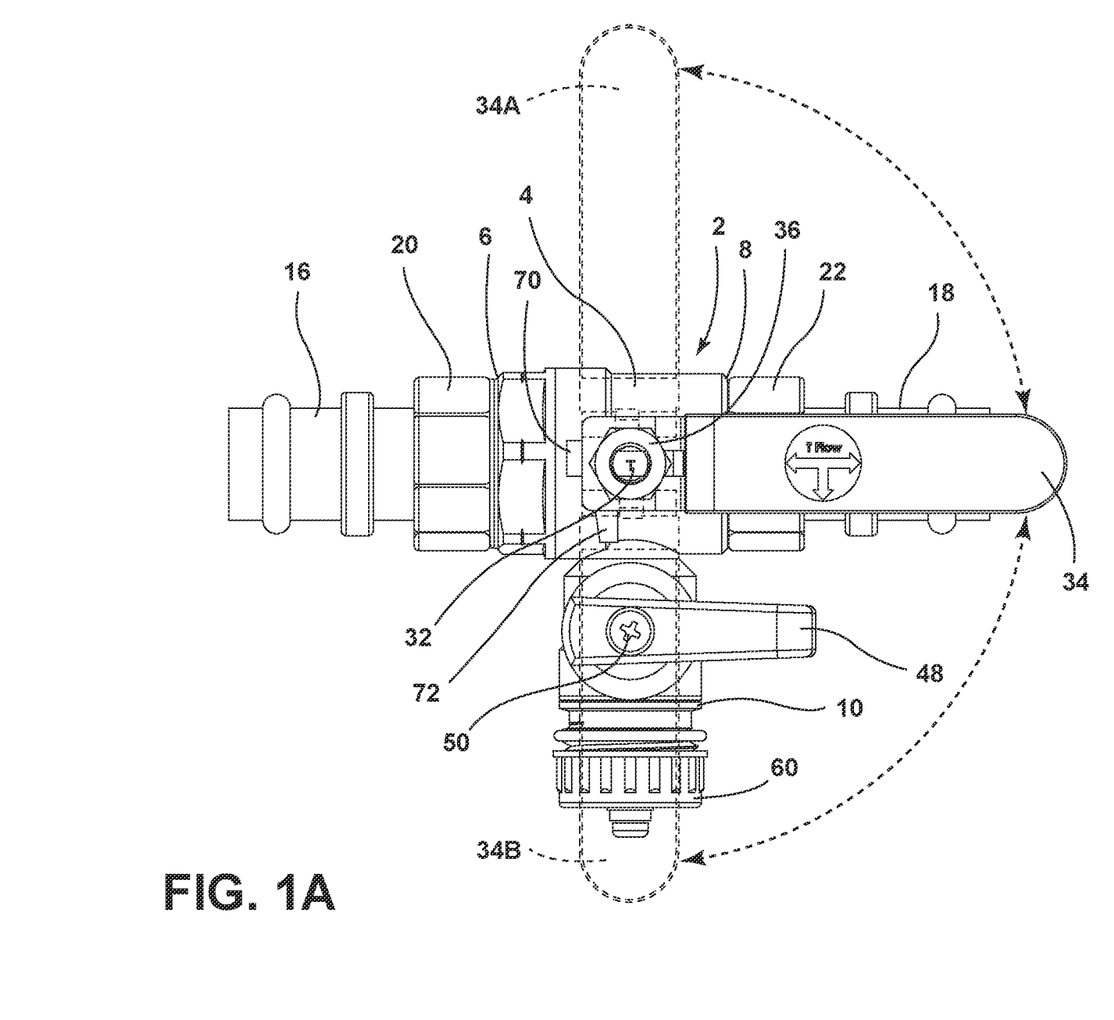
FIG. 1A is a front view of the dual union drain valve of FIG. 1 with the ball and stem rotated 180 degrees with various handle positions.
Figure 2:
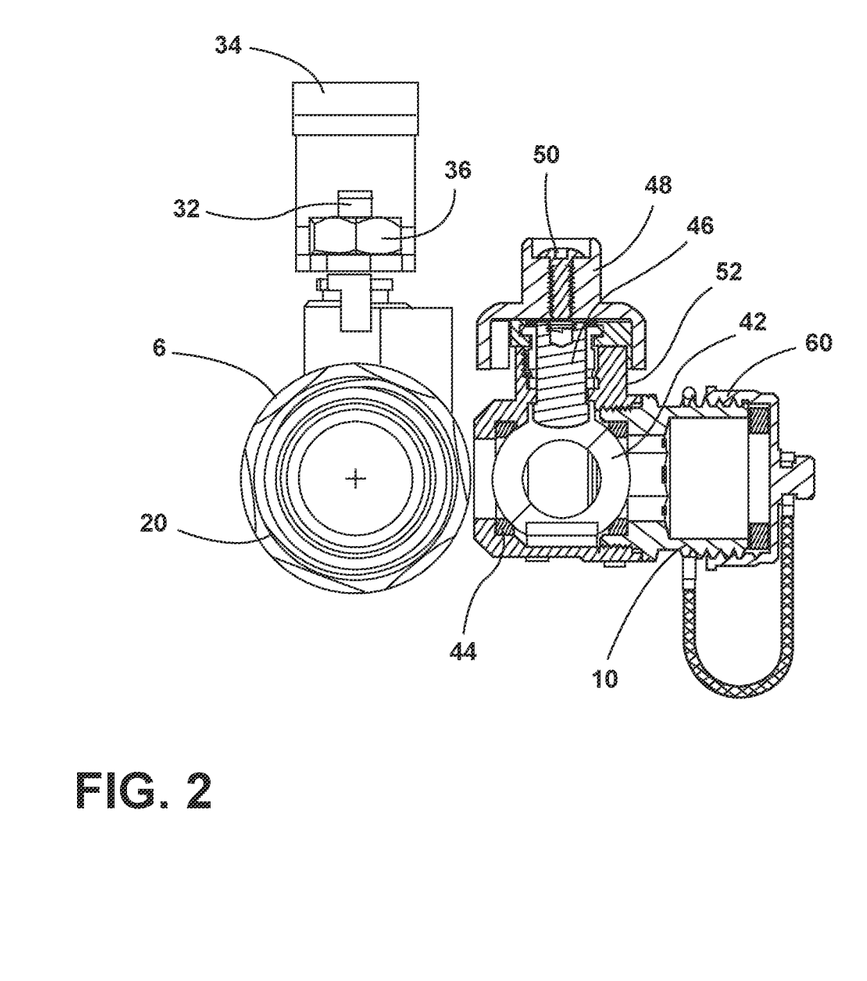
FIG. 2 is a partial cross-sectional side view of the dual union drain valve shown in FIG. 1.

The handle 34 can be removed form the stem 32 by a removing nut 36. This permits the rotation of the stem 32 and the ball 28 before the handle 34 is reinstalled on the stem 32. For example, the stem 32 and ball 28 may be rotated 180 degrees from what is shown in FIG. 1 to what is shown in FIG. 1A. This reverses the ball 28 to the opposite direction. The visual T symbol on the top of the stem 32 remains properly oriented with the fluid passageway openings on the ball 28 during such rotation. This ability permits different orientations of the handle 34 depending upon spatial constraints around the dual union drain valve 2. It also permits different orientations of the tee-flow capability of the ball 28. This can be of significance depending upon whether the dual union drain valve 2 is to be in a horizontal, vertical, or other position and/or what plumbing components are coupled to or adjacent to the first fitting 16 and second fitting 18.

The rotation of the handle 34 may be restricted by one or more stops (70, 72) located on the valve body 4. While the illustrated embodiment shows two stops (70, 72), the height and shape of the stops (70, 72) may be adjusted, or no stops used at all on the valve body 4. Stop features may also be included on the handle 34. In the illustrated embodiments shown in FIGS. 1 and 1A, the handle 34 may be rotated clockwise or counterclockwise 90 degrees for a full 180-degree of range. In the configuration shown in FIG. 1, the ball 28 will be closed off to the third port 10 when the handle is in the first position (shown in solid lines). When the handle 34 is rotated counterclockwise 90 degrees to a second position 34A, the ball 28 will be closed off to the second port 8. Lastly, when the handle 34 is rotated clockwise 90 degrees from the first position, third position 34B will have the ball 28 closed off to the first port 6.

In the configuration shown in FIG. 1A, the ball 28 in its first position will be open to all ports. When the handle 34 is rotated 90 degrees counterclockwise, the ball 28 will be closed off to the first port 6, in the second position 34A. When the handle 34 is rotated 90 degrees clockwise from the first position, the ball 28 will be closed off to the second port, as shown in third position 34B.

The one or more stops (70, 72) may permit the rotation of the handle only 90 degrees depending upon the height and position of the stops (70, 72). In such a case, the positioning of the ball 28 and the handle 34 may permit draining from above the ball 28 or from below the ball 28 when the third port 10 is positioned in a generally horizontal manner. This is accomplished by having the closed quadrant of the ball 28 positioned facing the third port 10 and permitting the handle rotation clockwise 90 degrees to permit draining from above the ball 28 as the closed quadrant of the ball 28 will be facing the first port 6. When the closed quadrant of the ball 28 is positioned toward the sidewall of the valve body 4 opposite the third port 10 after the ball 28 and stem 32 are rotated, the handle 34 may be rotated clockwise to have the closed quadrant of the ball 28 facing the second port 8 permitting draining from below the ball 28 when the third port 10 is in a generally horizontal position. Similarly, the positioning of the ball 28 and the handle 34 may permit the draining from either side of the ball 28 when the third port 10 is positioned in a generally vertical manner.

A second valve member 40 may be used next to the third port 10. The second valve member 40 has a ball 42 sealed within the fluid passageway by seals 44. A stem 46 is coupled to the ball 42. A handle 48 may be coupled to the stem 46 by a fastener 50. The stem 46 is positioned within the raised stem boss 52. The second valve member 40 may be used to open and close the fluid passageway 5 to the third port 10, permitting the third port 10 to act as a drain port. The use of the first valve member 26 in conjunction with the second valve member 40 can permit the third port 10 to drain either or both of the first port 6 and second port 8.

Figure 6:
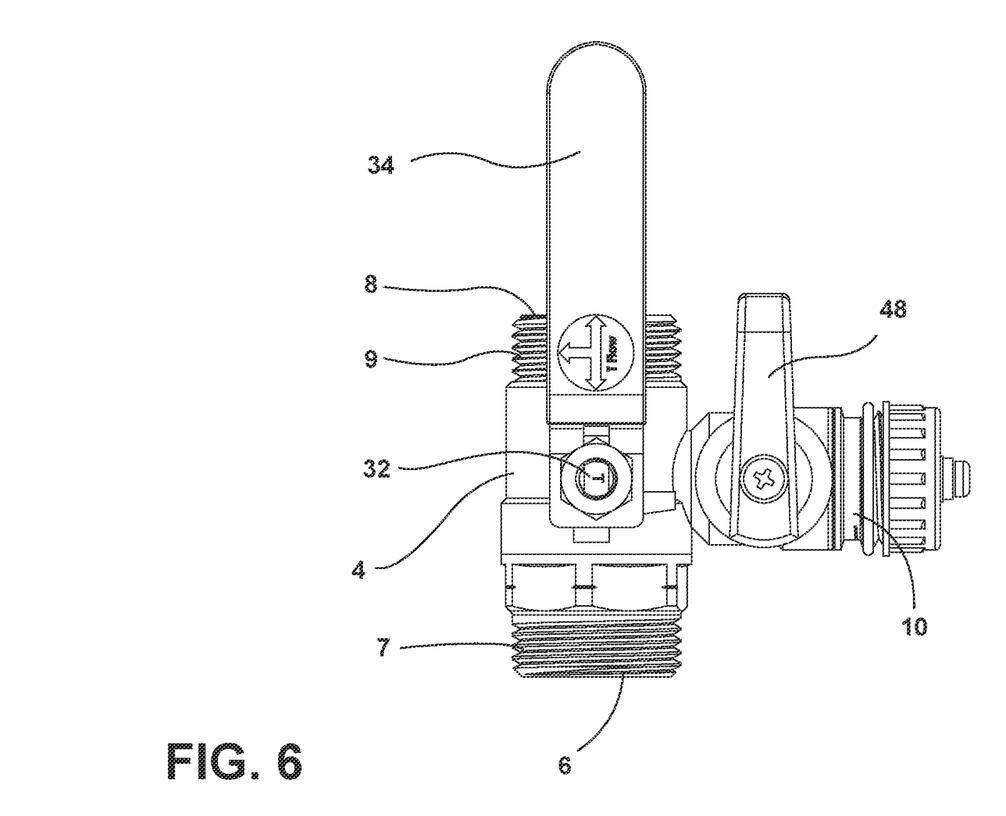
FIG. 6 is a front view of the dual union drain valve shown in FIG. 4 in a rotated orientation.
Figure 7:
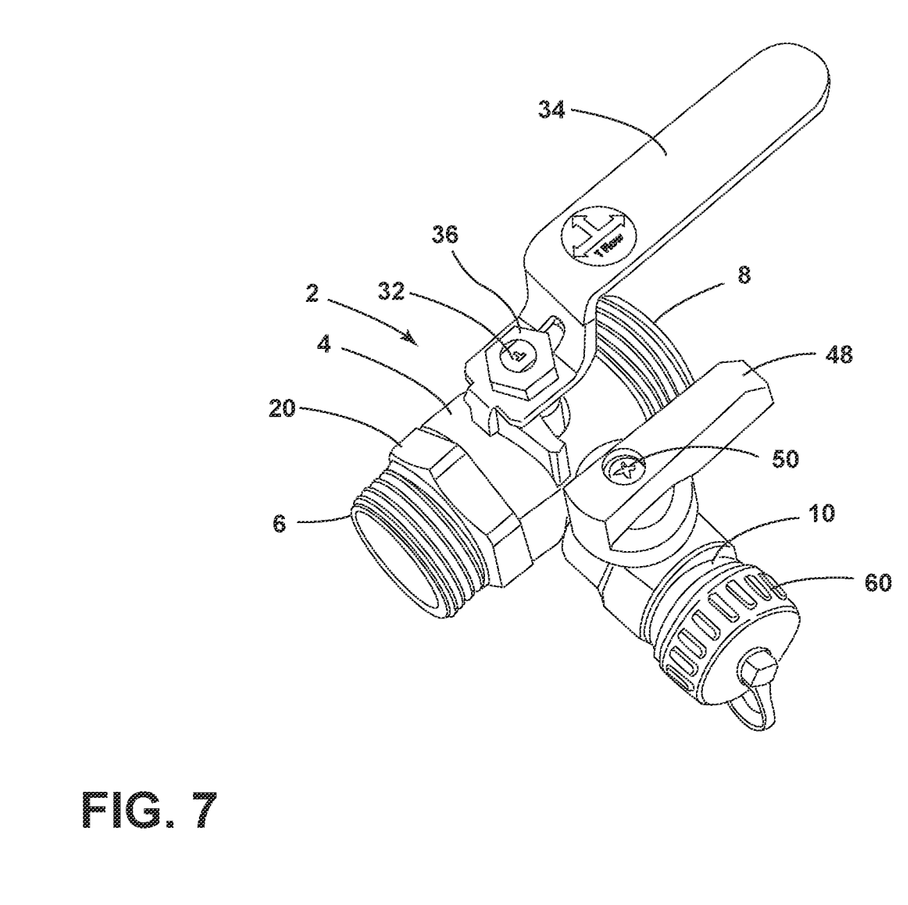
FIG. 7 is a perspective side view of the dual union valve shown in FIG. 4.
Figure 8:
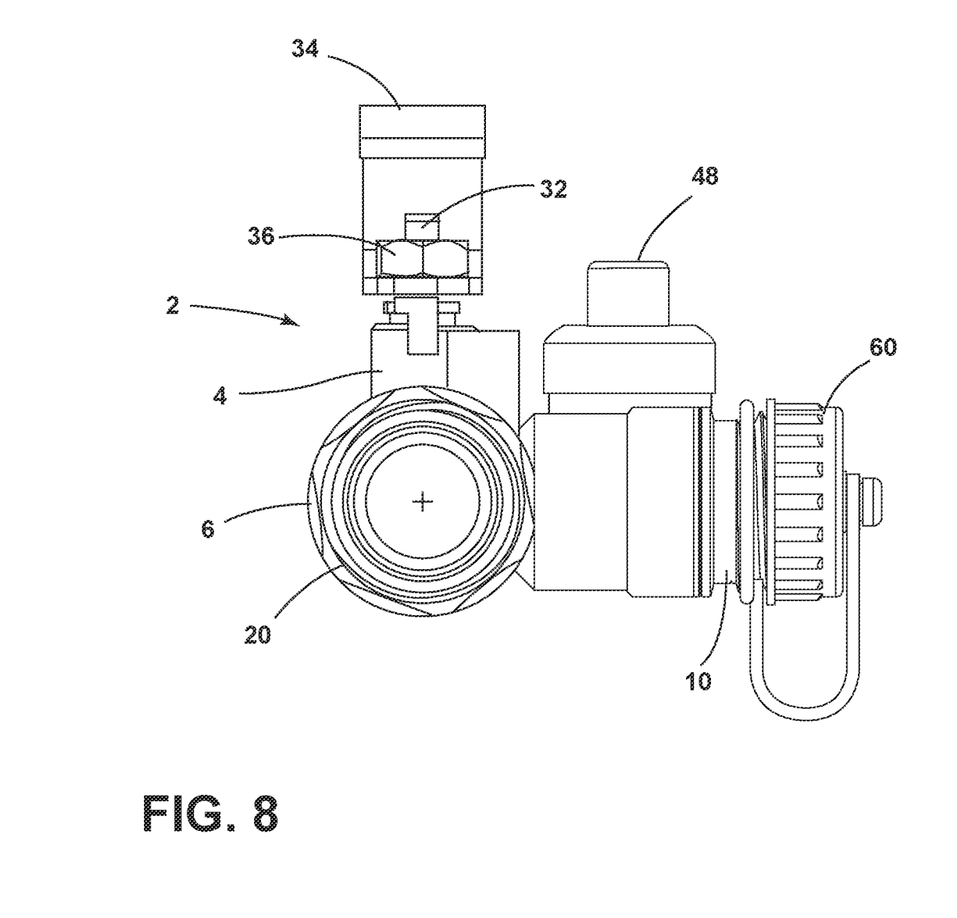
FIG. 8 is a side view of the dual union valve shown in FIG. 4.

The dual union drain valve 2 may be assembly with the third port 10 in a generally vertical orientation (such as shown in FIG. 1, 1A, 3, or 4), in a generally horizontal orientation (as shown in FIGS. 6 and 8), or in a different position.

Figure 5:
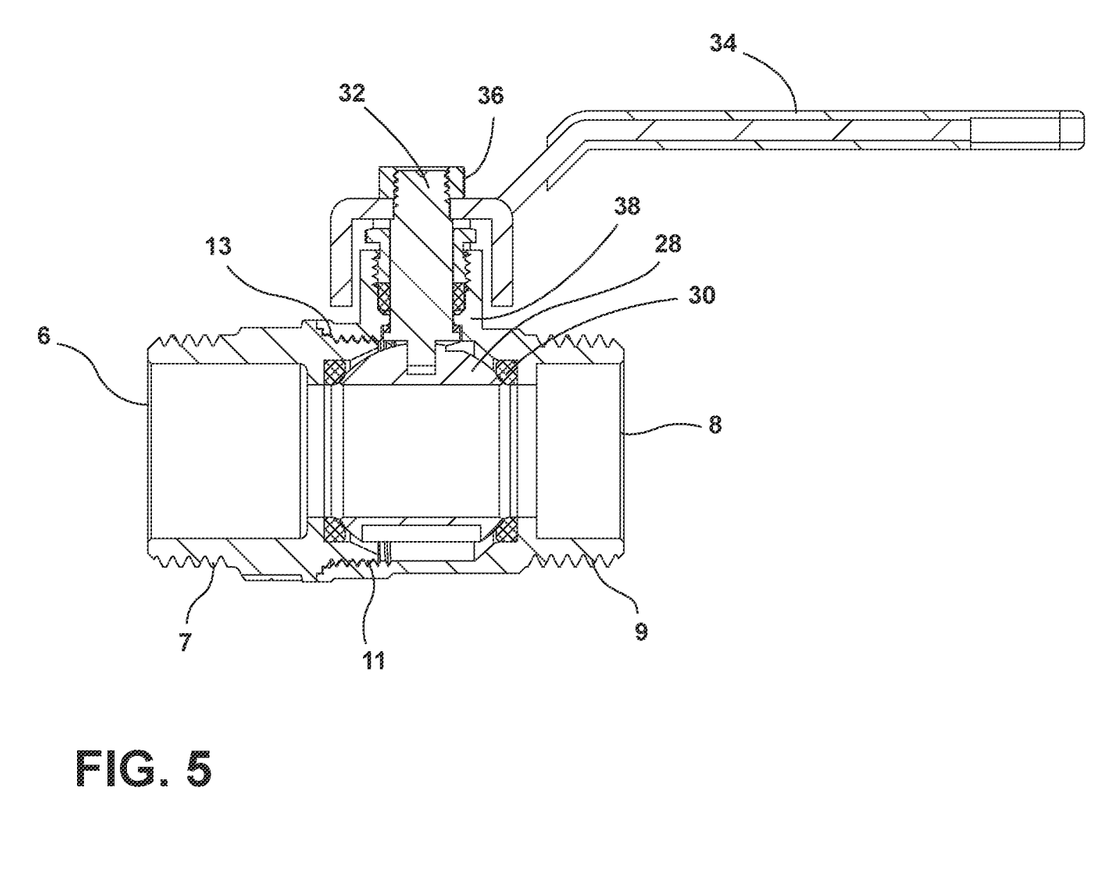
FIG. 5 is a cross-sectional side view of the dual union drain valve shown in FIG. 4.

While the dual union drain valve body 4 is shown as multiple parts that can be coupled together by threaded surfaces 11 and 13 (see FIG. 5), the dual union drain valve body 2 may be formed as a single piece. The dual union drain valve body 4 may be made of a metal material such as brass or, more preferably, of a lead-free, dezincification-resistant (DZR) brass alloy.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A dual union drain valve, comprising:
   a tee-shaped valve body having a fluid passageway between a first port, a second port disposed opposite said first port, and a third port, said third port disposed perpendicular to said first and second ports;
   a first valve assembly disposed at the intersection in said tee-shaped valve body, said first valve assembly including a ball with three openings that can be positioned within the fluid passageway, said ball coupled to a stem having a T symbol that corresponds to the three openings such that the side of the ball that has no fluid passageway opening is in alignment with the flat top of the T symbol;
   a removable handle coupled to said stem;
   at least one handle stop located on said valve body;
   a second valve assembly disposed adjacent to said third port;
   a first fitting with a first union coupling having an internal threaded surface that couples with an external threaded surface on said first port; and
   a second fitting with a second union coupling having an internal threaded surface that couples with an external threaded surface on said second port.

2. The dual union drain valve of claim 1, wherein the first fitting and second fitting are the same type of fitting.

3. The dual union drain valve of claim 1, wherein the first fitting and second fitting are different types of fittings.

4. The dual union drain valve of claim 1, wherein the first union coupling is integrally formed with the first fitting and the second union coupling is integrally formed with the second fitting.

5. The dual union drain valve of claim 1, wherein the first union coupling is a separate piece from the first fitting.

6. The dual union drain valve of claim 1, wherein the second union coupling is a separate piece from the second fitting.

7. The dual union drain valve of claim 1, wherein said side of said ball that has no fluid passageway opening is aligned with the third port and can be rotated toward the first port when the handle is rotated.

8. The dual union drain valve of claim 1, wherein said side of said ball that has no fluid passageway opening is aligned with the sidewall of the valve body opposite the third port and can be rotated toward the second port when the handle is rotated.

9. A dual union valve, comprising:
   a tee-shaped valve body having a fluid passageway between a first port, a second port disposed opposite said first port, and a third port, said third port disposed perpendicular to said first and second ports;
   a first valve assembly disposed at the intersection in said tee-shaped valve body, said first valve assembly including a ball with three openings that can be positioned within the fluid passageway, said ball coupled to a stem having a T symbol that corresponds to the three openings such that the side of the ball that has no fluid passageway opening is in alignment with the flat top of the T symbol;

a removable handle coupled to said stem;

at least one handle stop located on said valve body, permitting the handle to rotate within a 90 degree range;

a first fitting with a first union coupling having an internal threaded surface that couples with an external threaded surface on said first port; and a second fitting with a second union coupling having an internal threaded surface that couples with an external threaded surface on said second port.

10. The dual union valve of claim 9, wherein the first fitting and second fitting are the same type of fitting.

11. The dual union valve of claim 9, wherein the first fitting and second fitting are different types of fittings.

12. The dual union valve of claim 9, wherein the first union coupling is a separate piece from the first fitting.

13. The dual union valve of claim 9, wherein the second union coupling is a separate piece from the second fitting.

14. The dual union valve of claim 9, wherein said side of said ball that has no fluid passageway opening is aligned with the third port and can be rotated toward the first port when the handle is rotated.

15. The dual union valve of claim 9, wherein said side of said ball that has no fluid passageway opening is aligned with the sidewall of the valve body opposite the third port and can be rotated toward the second port when the handle is rotated.

16. A dual union drain valve, comprising:

a tee-shaped valve body having a fluid passageway between a first port, a second port disposed opposite said first port, and a third port, said third port with a threaded external surface disposed perpendicular to said first and second ports;

a first valve assembly disposed at the intersection in said tee-shaped valve body, said first valve assembly including a ball with three openings that can be positioned within the fluid passageway, said ball coupled to a stem having a T symbol that corresponds to the three openings such that the side of the ball that has no fluid passageway opening is in alignment with the flat top of the T symbol;

a removable handle coupled to said ball, said removable handle permitting the rotation of said ball and said stem within said intersection when said handle is removed;

a second valve assembly disposed adjacent to said third port;

a first fitting with a first union coupling having an internal threaded surface that couples with an external threaded surface on said first port; and a second fitting with a second union coupling having an internal threaded surface that couples with an external threaded surface on said second port.

17. The dual union drain valve of claim 16, wherein the first fitting and second fitting are the same type of fitting.

18. The dual union drain valve of claim 16, wherein the first union coupling is integrally formed with the first fitting and the second union coupling is integrally formed with the second fitting.

19. The dual union drain valve of claim 16, wherein said side of said ball that has no fluid passageway opening is aligned with the third port, when the third port is in a generally horizontal position, and can be rotated toward the first port when the handle is rotated.

20. The dual union drain valve of claim 16, wherein said side of said ball that has no fluid passageway opening is aligned with the sidewall of the valve body opposite the third port, when the third port is in a generally horizontal position, and can be rotated toward the second port when the handle is rotated.

* * * * *